(12) United States Patent
Zanzinger

(10) Patent No.: US 11,976,710 B2
(45) Date of Patent: May 7, 2024

(54) DEVICE HAVING A MAIN SUPPORT AND AN EQUIPMENT SUPPORT

(71) Applicant: Continental Automotive GmbH, Hannover (DE)

(72) Inventor: Werner Zanzinger, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 980 days.

(21) Appl. No.: 16/814,568

(22) Filed: Mar. 10, 2020

(65) Prior Publication Data

US 2020/0208719 A1 Jul. 2, 2020

Related U.S. Application Data

(63) Continuation of application No. PCT/EP2018/073931, filed on Sep. 6, 2018.

(30) Foreign Application Priority Data

Sep. 11, 2017 (EP) ..................................... 17465547

(51) Int. Cl.
*F16H 21/14* (2006.01)
*B60K 20/02* (2006.01)
(Continued)

(52) U.S. Cl.
CPC ............... *F16H 21/14* (2013.01); *B66F 3/12* (2013.01); *B66F 11/00* (2013.01); *B60K 20/02* (2013.01);
(Continued)

(58) Field of Classification Search
CPC .. F16H 21/14; F16H 21/22; B66F 3/12; B66F 11/00; B60K 2370/67; B60K 2370/816;
(Continued)

(56) References Cited

U.S. PATENT DOCUMENTS 7,331,425 B2 * 2/2008 Bukowski ................. B66F 7/18
187/269
9,938,126 B2 * 4/2018 Ooe ....................... B66F 7/0666
(Continued)

FOREIGN PATENT DOCUMENTS

CN 102039947 A 5/2011
CN 102556889 A 7/2012
(Continued)

OTHER PUBLICATIONS

Japanese Notice of Reasons for Refusal drafted Mar. 26, 2021Japanese Patent Application No. 2020-514582.
(Continued)

*Primary Examiner* — Seahee Hong

(57) ABSTRACT

A device comprising a main support an equipment support having a first position and a second position adjustable relative to the height of the main support. A first crank lever is mounted to the first bearing and rotatable about a first rotational axis via a first shaft. A connecting rod is connected to the first crank lever via a first joint and to the equipment support via a second joint. A guide is arranged such that the equipment support is displaceable while guided to remain parallel to the main support. The equipment support passes an upper dead center position when moving from a first to a second position by rotation of the first crank lever and, upon further rotation a stop element contacts a stop.

14 Claims, 10 Drawing Sheets

(51) Int. Cl.
*B60K 37/06* (2006.01)
*B60R 11/02* (2006.01)
*B66F 3/12* (2006.01)
*B66F 11/00* (2006.01)

(52) U.S. Cl.
CPC .......... *B60K 37/06* (2013.01); *B60K 2370/67* (2019.05); *B60K 2370/744* (2019.05); *B60K 2370/816* (2019.05); *B60R 11/02* (2013.01)

(58) Field of Classification Search
CPC .. B60K 2370/744; B60K 20/02; B60K 37/06; B60R 11/02
See application file for complete search history.

(56) References Cited

U.S. PATENT DOCUMENTS

| | | | | |
|---|---|---|---|---|
| 2007/0135285 | A1* | 6/2007 | Schiebout | B29C 66/92615 493/197 |
| 2012/0181735 | A1 | 7/2012 | Ooe | |
| 2013/0146737 | A1 | 6/2013 | Wen | |
| 2013/0312551 | A1* | 11/2013 | Ehrmann | B65B 65/02 74/44 |
| 2017/0166095 | A1 | 6/2017 | Pleskot | |

FOREIGN PATENT DOCUMENTS

| | | |
|---|---|---|
| DE | 19805800 A1 | 9/1998 |
| DE | 102015012890 A1 | 4/2017 |
| DE | 102015015878 A1 | 6/2017 |
| EP | 0018662 A1 | 11/1980 |
| EP | 0839757 A1 | 5/1998 |
| EP | 1724232 A2 | 11/2006 |
| JP | S56004469 U | 12/1899 |
| JP | S61172931 A | 8/1986 |
| JP | H07215109 A | 8/1995 |
| JP | H08282982 A | 10/1996 |
| JP | H10138929 A | 5/1998 |
| JP | 2000002008 A | 1/2000 |
| JP | 2002323107 A | 11/2002 |
| JP | 2011088697 A | 5/2011 |
| JP | 2014196172 A | 10/2014 |
| JP | 2016130151 A | 7/2016 |
| JP | 2017001856 A | 1/2017 |

OTHER PUBLICATIONS

Search dated Aug. 17, 2022 from corresponding Chinese patent application No. 201880058300.1.
Office Action dated Aug. 23, 2022 from corresponding Chinese patent application No. 201880058300.1.
European Search Report dated Feb. 23, 2018 from corresponding European Patent Application No. EP 17465547.2.
International Search Report and Written Opinion dated Jan. 9, 2019 from corresponding International Patent Application No. PCT/EP2018/073931.

* cited by examiner

DEVICE HAVING A MAIN SUPPORT AND AN EQUIPMENT SUPPORT

CROSS-REFERENCE TO RELATED APPLICATION

This U.S. patent application claims the benefit of PCT patent application No. PCT/EP2018/073931, filed Sep. 6, 2018, which claims the benefit of European patent application No. 17465547.2, filed Sep. 11, 2017, both of which are hereby incorporated by reference.

TECHNICAL FIELD

The invention relates to a device having a main support and an equipment support for motor vehicles.

BACKGROUND

Equipment supports in which the height is adjustable between a first position and a second position relative to the main support are known from the prior art.

A main support is for example arranged in the interior of a motor vehicle and fixedly connected to the body of the motor vehicle. Equipment such as for example controls in the form of joysticks or keypads, or display elements in the form of screens or touch screens for example, is/are attached to the equipment support.

In order to be able to adapt the position of these devices to the different users of a motor vehicle or according to the operating situation, the height of the main support and hence the devices is adjustable from a first position to a second position relative to the body. (For safety reasons, it is often provided that the height can only be adjusted when the vehicle is stationary, in order not to unnecessarily distract the driver during travel.)

In a first position, the equipment support lies directly on the main support or on components rigidly attached to the main support. In order to bring the equipment support to a second position, the equipment support is raised relative to the main support, i.e. adjusted relative to the main support, via a mechanism. During driving of the motor vehicle, the various acceleration levels occurring and the force effects from the driver exert great forces on the mechanism, in particular when the driver places his hand or entire arm on the control element during driving, so that in particular in the case when a drive element is present, this can lead to generous dimensioning of the mechanism and drive element.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The object of the invention is to indicate a device which, provides a drive element with as little power as possible and a mechanism which is designed economically.

A drive is formed with a first crank lever and a connecting rod and a guide for the equipment support, a movement of the equipment support resembles the movement sequence of a reciprocating piston internal combustion engine, wherein the equipment support corresponds to the circular part of the piston, the first crank lever corresponds to the crankshaft, the connecting rod to the connecting rod, and the guide to the cylinder and the cylindrical part of the piston of the reciprocating piston engine.

The drive takes place from the first crank lever to the connecting rod and from there to the equipment support, and not conversely as in the case of a piston engine. The guidance can be achieved by one or more guide blocks which are each guided by a guide rail. The guide rails are either rigidly connected to the main support or the equipment support, while the guide blocks are then rigidly connected correspondingly to the other component (equipment support or main support).

The mounting of the first crank lever for rotation of the first crank lever about the first rotational axis may take place via a first shaft which is mounted by a first bearing so as to be rotatable about the first rotational axis, wherein the first bearing is rigidly connected to the main support. For rotation of the first crank lever about the first rotational axis, the first crank lever may also be mounted by means of a first bearing which is arranged between the crank lever and a mandrel. The mandrel may be arranged or formed directly on the main support and thus a first shaft may be omitted.

Because a stop element is connected to the first crank lever rigidly or via a second gear mechanism, and the stop for the stop element is positioned such that the equipment support can reach and overcome its upper dead center, and then on continued rotation in the same direction the stop element comes to rest on the stop. This prevents a force acting on the equipment support from above from being able to act on any drive element present, since the force is diverted into the main support via the stop element and the stop, and the drive element is no longer loaded with this force.

If the stop element is rigidly connected to the first crank lever or is configured in the first crank lever, the first crank lever is prevented from turning further, and the first crank lever, a bearing of the crank lever, the connecting rod and the guide must be able to transfer the occurring forces without damaging the first crank lever, the bearing of the first crank lever, the connecting rod and the guide.

If the stop element is rigidly connected to the connecting rod or configured as part of the connecting rod, the first crank lever and the bearing of the crank lever are load-relieved and may be configured accordingly, so that they need only absorb forces which occur on adjustment of the equipment support from the first to the second position or vice versa.

If the stop element is connected to the connecting rod or the first crank lever via a second gear mechanism, the position of the stop element may be selected such that, after overcoming the upper dead center of the equipment support, the stop element comes to rest on the stop and thus the force acting on the equipment support in the second position is transferred from the equipment support via the stop element and stop into the main support. Thus, the first crank lever and the connecting rod need merely be dimensioned so that they can absorb the forces which occur on adjustment from the first to the second position or vice versa.

The second gear mechanism may for example be configured as a gearwheel mechanism or as a coupled gear mechanism. When designed as a coupled gear mechanism, the stop element may be rigidly connected to a gear rod which is connected in articulated fashion to the connecting rod and/or the first crank lever. The gear rod may have a linear elongation, but may also be bent and/or cranked depending on the installation situation. The latter embodiment may be useful for example in the first position, if the position of a drive motor would have to be changed to accommodate a linear elongation of the gear rod.

If the coupled gear mechanism has a second crank lever, and the second crank lever is mounted by means of the second bearing so as to be rotatable about a second axis, the stop element is arranged at a distance from the second axis on the second crank lever, and the gear mechanism is connected in articulated fashion to the second crank lever at a distance from the second axis, then before reaching the second position after overcoming the upper dead center, the stop element is pivoted in the direction of the stop and finally brought to rest on the stop. When the stop element rests on the stop, the force acting on the equipment support is transferred into the stop via the second bearing and the second crank lever.

In one embodiment a second shaft is mounted by means of the second bearing, and the second crank lever is pivotable about the second rotational axis by means of the shaft, and the second bearing is rigidly connected to the equipment support. Then a load acting on the equipment support is guided via the second bearing, the second shaft and the second crank lever to the stop, so that the gear rod is not loaded with this load. It is also possible to configure the second crank lever so as to be rotatable directly via the second bearing and thus omit the second shaft. The second bearing may for example surround a mandrel which is rigidly connected to the equipment support.

If, in addition, the second crank lever has a second support face or is rigidly connected to a second support face, and in the second position the equipment support rests on this support face, the force acting on the equipment support is transferred from the equipment support to the support face, from there via the second crank lever and the stop element into the stop, so that the other movable components mentioned above—with the exception of the guide and the second bearing—need not be designed for these additional forces occurring.

If two second crank levers are provided which have a common rotational axis, the force occurring may be distributed better. Thus the tilt forces occurring on guidance may be reduced. If the two second crank levers are arranged on a second shaft and are rigidly connected together by means of the second shaft, they may be adjusted jointly.

If the two second crank levers are rigidly connected together via a connecting element, firstly the stability is increased, and only one articulated connection is required for rotation of the two crank levers, even if the two crank levers are not arranged together on a second shaft. Furthermore, the connecting element may be configured as a second support face on which the equipment support rests in the second position.

Finally, the guide and the second bearing may also be completely load-relieved if the device has four second crank levers, wherein in each case two second crank levers are rigidly connected together, two of the crank levers are rotatable about the second rotational axis and the other two crank levers about a third rotational axis, and the second and third rotational axes are arranged parallel to each other.

In the second position, the equipment support lies on a total of four stops via the stop elements. Therefore, in the second position, force can not be introduced into the guide via the equipment support. Furthermore, with the above-mentioned embodiment, the second shafts and/or second bearings may be load-relieved when the equipment support rests on the second support faces in the second position. The second support faces may for example each be implemented by a respective connecting element, which rigidly connects together the two crank levers arranged on the second rotational axis or the two arranged on the third rotational axis, and on which in each case the equipment support rests in the second position, and thus the connecting elements act as support faces. The second support faces may also be implemented in that the second crank levers each have a second support face or are rigidly connected to a second support face.

If only one gear rod is to be used, a respective second crank lever of the second rotational axis may be connected in articulated fashion to a second crank lever of the third rotational axis by means of a coupling rod.

If no coupling rod is to be used or if this cannot be used for space reasons, a respective crank lever of the second and third rotational axes may be connected in articulated fashion to the first crank lever or first connecting rod via a respective gear rod. The preferred selection depends on the installation situation of the equipment support. One skilled in the art would be able to determine the preferred selection based on the equipment support and installation situation.

If the stop and the stop element are configured such that, when the stop element rests on the stop, the stop partially surrounds the stop element by form fit, the equipment support is locked to the main support in the second position when the stop element rests on the stop. This further extends the possible applications of the device.

In another possible embodiment, the stop as a latch is formed as a part circle or circle in face view, and the stop is configured such that, when the stop element rests on the stop, it surrounds the stop element by up to 50%. However, other forms of stop element are conceivable for achieving a locking as long as the stop element is partly surrounded by the stop with form fit.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
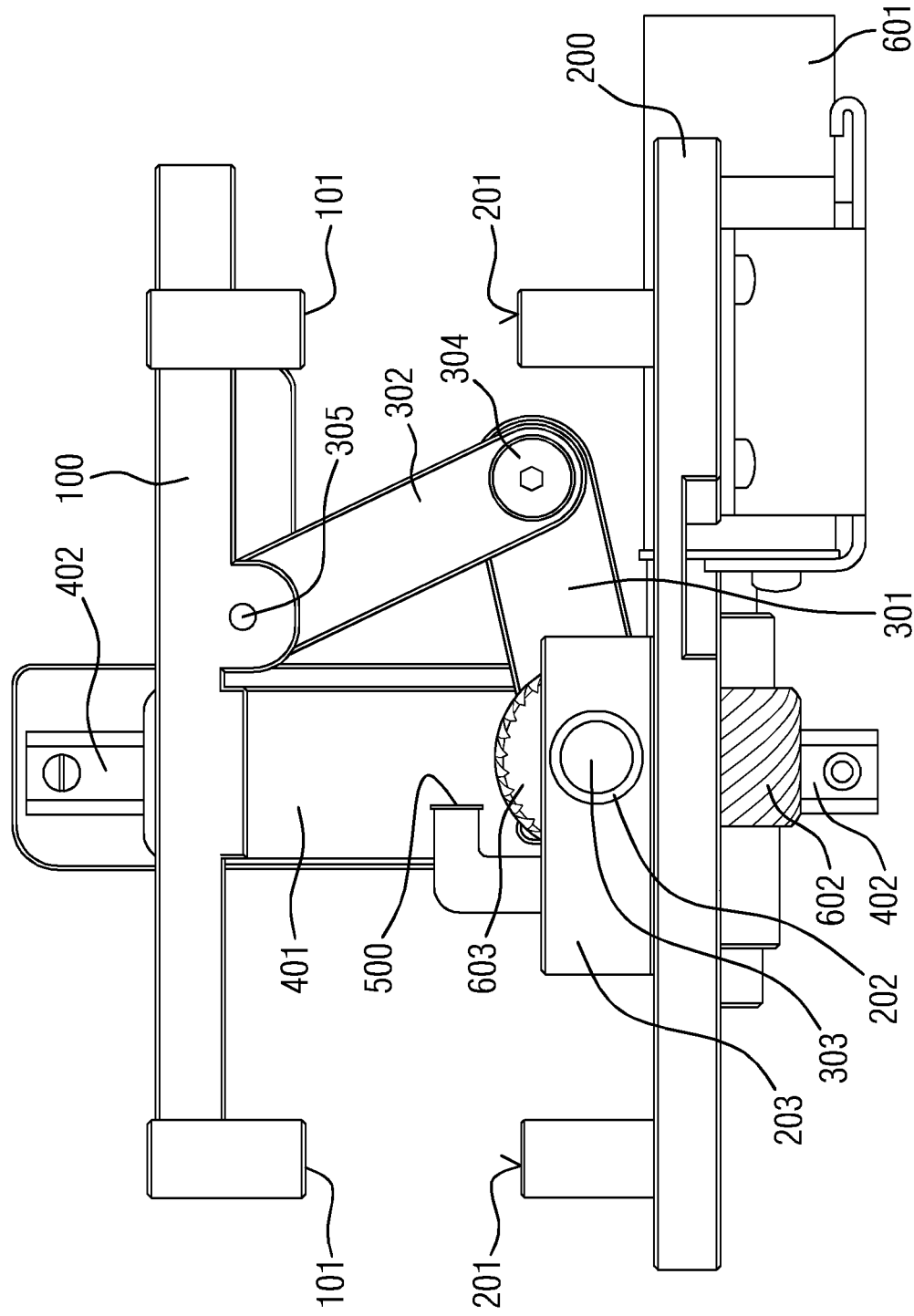
FIG. 1 a side view of a first exemplary embodiment of a device with a position of an equipment support between a first and second position.
Figure 2:
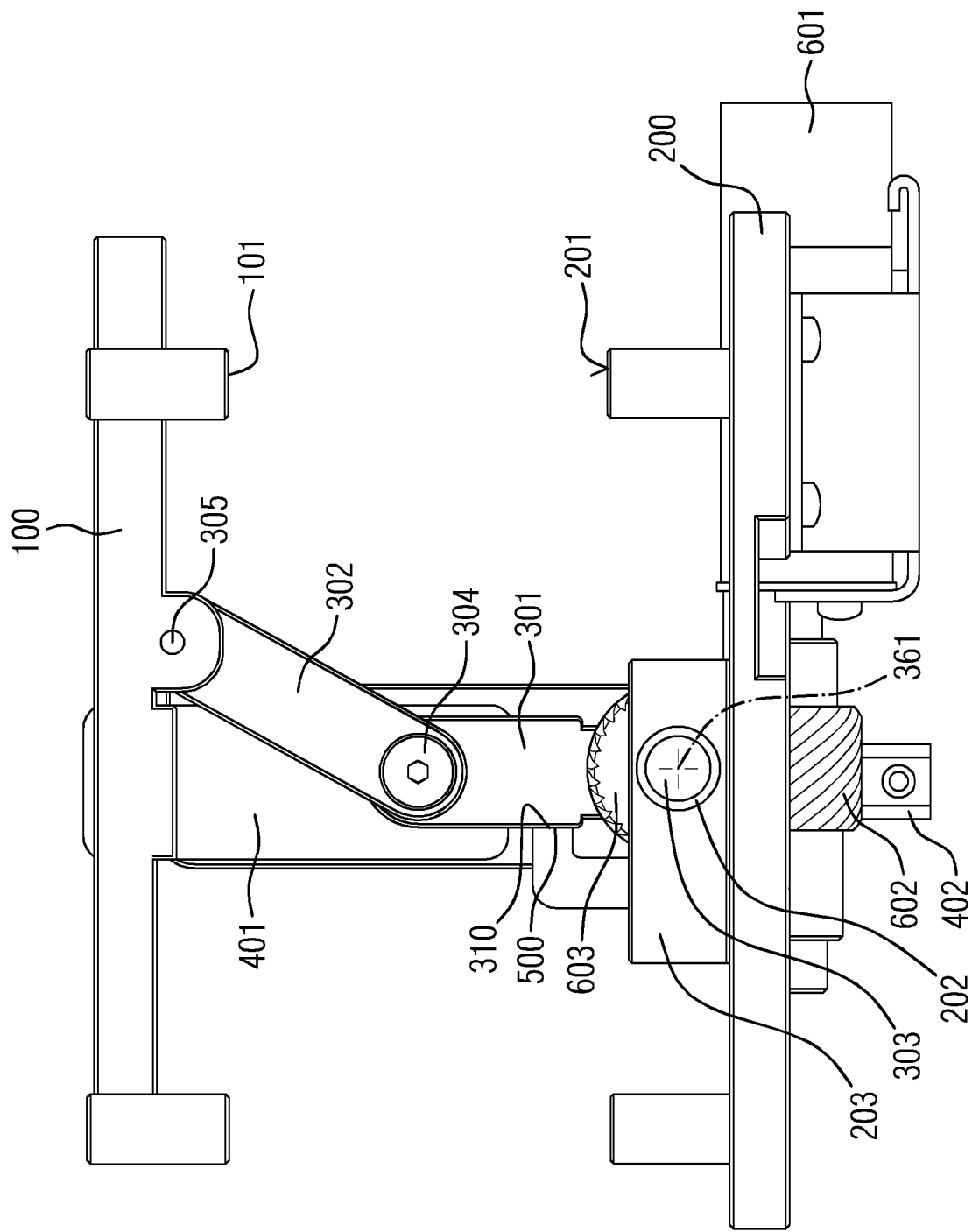
FIG. 2 a side view of the first exemplary embodiment from FIG. 1 with a position of the equipment support in the second (upper) position.
Figure 3:
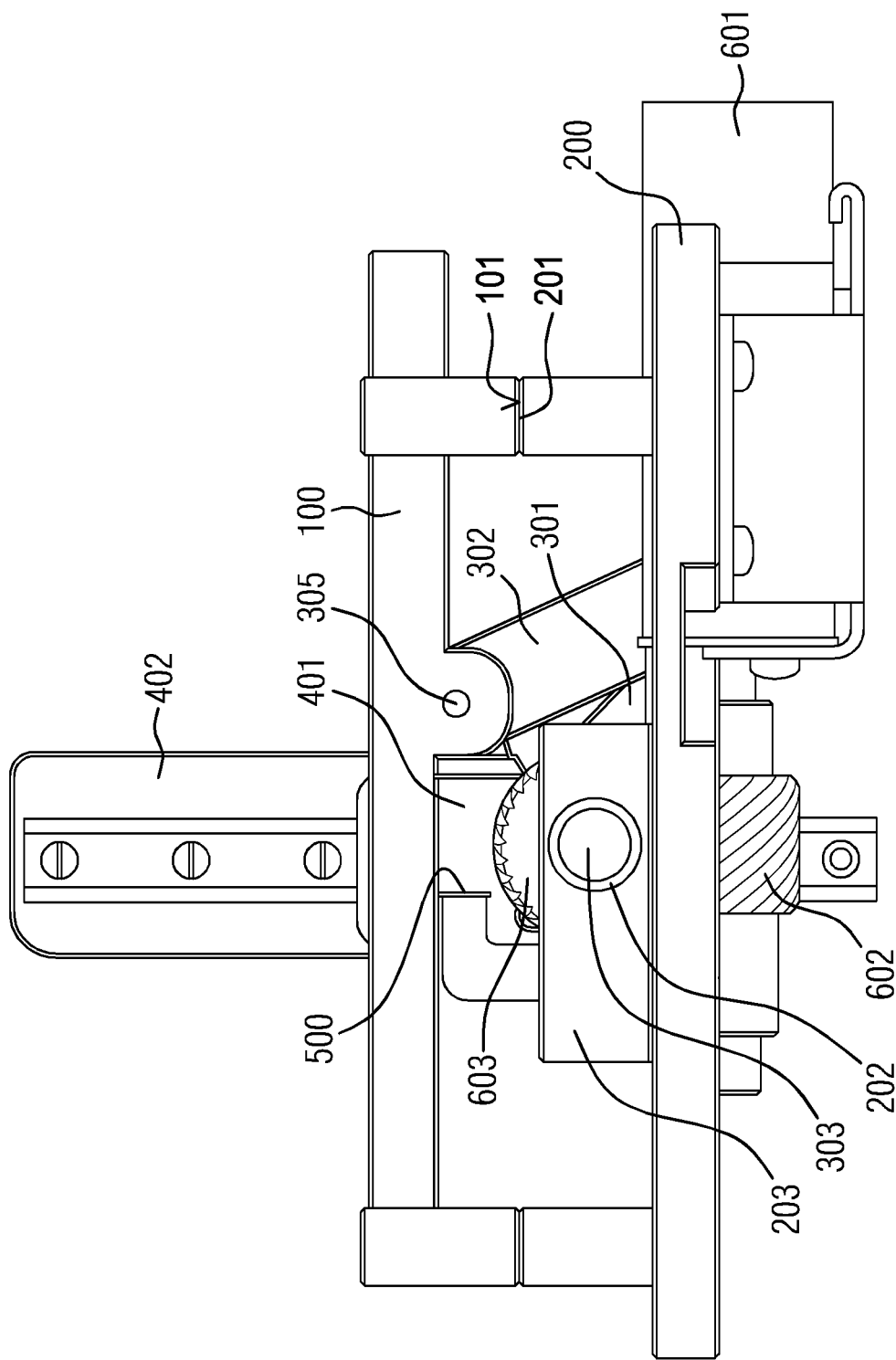
FIG. 3 a side view of the first exemplary embodiment from FIGS. 1 and 2 with a position of the equipment support in the first (lower) position.

FIGS. 1-3 show an equipment support 100, a main support 200, a first crank lever 301, a connecting rod 302, a guide comprising guide blocks 401 and a guide rail 402, a stop 500, a drive element in the form of an electric motor 601, a first gear mechanism having a worm gear 602 and a spur gear 603. Supports 101 are formed on the equipment support 100, and first support faces 201 are formed on the main support 200. In the first position (FIG. 3), the equipment support 100 rests with supports 101 on the first support faces 201 of the main support 200. The support 101 and/or the first support face 201 may however also be separate components if they are rigidly connected to the equipment support 100 and main support 200 respectively. Also, the equipment support 100 and/or the main support 200 may be configured such that the support 101 and/or the first support face 201 may be omitted in an embodiment, if their functionality of supporting the equipment support 100 on the main support 200 in the first position is guaranteed in another fashion.

A first joint 304 connects the first crank lever 301 to the connecting rod 302, a second joint 305 connects the connecting rod 302 to the equipment support 100. The mounting of the worm gear 602 is not depicted. The spur gear 603 is mounted via a first shaft 303 and a first bearing 202 so as to be rotatable about a first rotational axis, wherein the first bearing is rigidly connected to the main support via a bracket 203. The spur gear 603 is rigidly connected to the first shaft 303 and thus mounted. The spur gear 603 may also be mounted via a mandrel on which the spur gear 603 is rotatably arranged via the first bearing 202. The mandrel may be arranged or formed directly on the main support 200 or the bracket 203 and thus a first shaft 303 may be omitted. The first bearing 202 may be configured for example as a plain bearing, a ball bearing, a roller bearing or a needle roller bearing. The electric motor may have brushes or be brushless, or be configured as a stepper motor or as a linear motor. Instead of the worm gear 602, a further spur gear may also be used. When the electric motor 601 is designed as a linear motor, the worm gear 602 may be replaced by a toothed rack. Instead of the electric motor 601, for example a pneumatic or hydraulic drive may also be used.

The first crank lever 301 is rigidly connected to the spur gear 603. The guide rail 402 is rigidly connected to the main support, and the guide blocks 401 are rigidly connected to the equipment support 100. The electric motor 601 drives the spur gear 603 via the worm gear 602.

If the spur gear 603 is turned counterclockwise starting from the position depicted in FIG. 1, the first crank lever 301 is also turned about the first rotational axis 361 standing perpendicularly to the drawing plane, so that the equipment support 101 is pressed upward along the guide rail 402 until the first rotational axis, the first joint 304 and the second joint 305 lie in a line, and at this moment the equipment support assumes its upper dead center position. If the first gear 603 is turned further counter-clockwise, the equipment support 100 moves down until the first crank lever 301, with its side formed as a stop element 310, hits against the stop 500 and thus is prevented from turning further, and hence assumes its second position. This situation is illustrated in FIG. 2. This situation may be detected by one or more sensors and the electric motor switched off so as to protect it from overload. This detection may be performed for example by measuring the current consumed by the motor, or by position sensors, wherein the position sensors may be configured for example inductively, capacitively and/or optically, and are able to detect the position of the stop element or first crank lever. In the case of a stepper motor, the necessary steps of the stepper motor, which are necessary for the equipment support to assume the second position, may also be counted.

If, in the second position shown in FIG. 2, a force presses onto the equipment support 100 from above, this force is transferred via the second joint 305, the connecting rod 302, the first joint 304 and the first crank lever 301 with the stop element 310, into the stop 500 and the first bearing 202, and where applicable into the guide rail 402. There is no loading on the worm gear 602 and electric motor 601. The devices to be supported may be attached to the equipment support 100 for example by means of screws, clips, soldering or welding. The equipment support may also be configured as part of the height-adjustable device, for example as a housing part of the height-adjustable device.

If the equipment support 100 is to be moved from the second position in FIG. 2 into the first position in FIG. 3, the electric motor drives the spur gear 603 via the worm gear 602 such that the spur gear 602 turns clockwise, the first crank lever is turned clockwise about its rotational axis, the equipment support is raised via the connecting rod 302 initially to the upper dead center and then, when the equipment support 100 turns further, moves down until its supports 101 rest on the first support faces 201 of the main support 200, and it assumes the first position shown in FIG. 3. This situation may also be detected by one or more sensors and the electric motor switched off so as to protect it from overload. This detection may be performed for example by measuring the current consumed by the motor, or by position sensors, wherein the position sensors may be configured for example inductively, capacitively and/or optically. In the case of a stepper motor, the steps of the stepper motor, which are involved for the equipment support to assume the first position, may also be counted.

Figure 4:
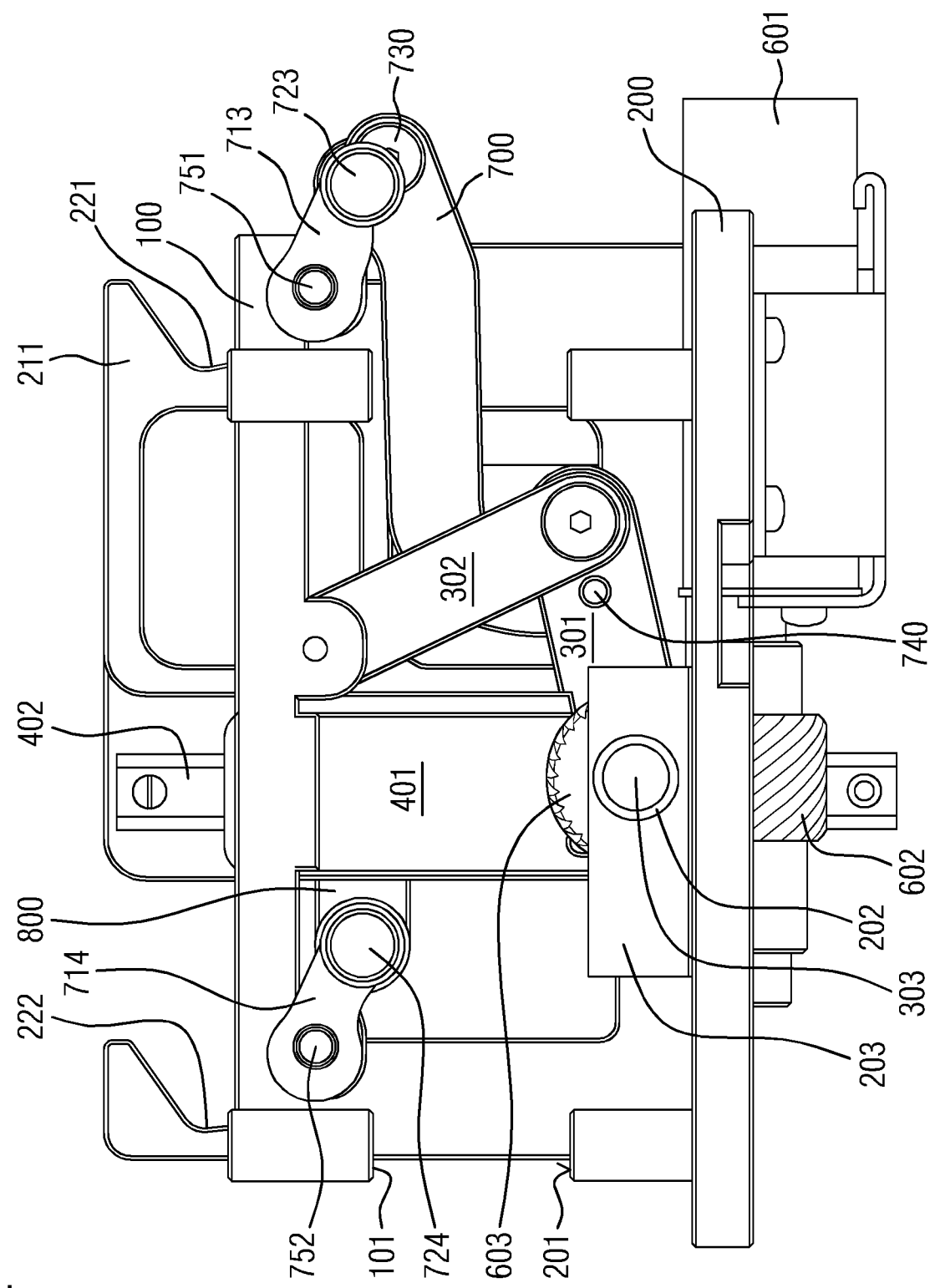
FIG. 4 a side view of a second exemplary embodiment in a position between the first and second positions.
Figure 5:
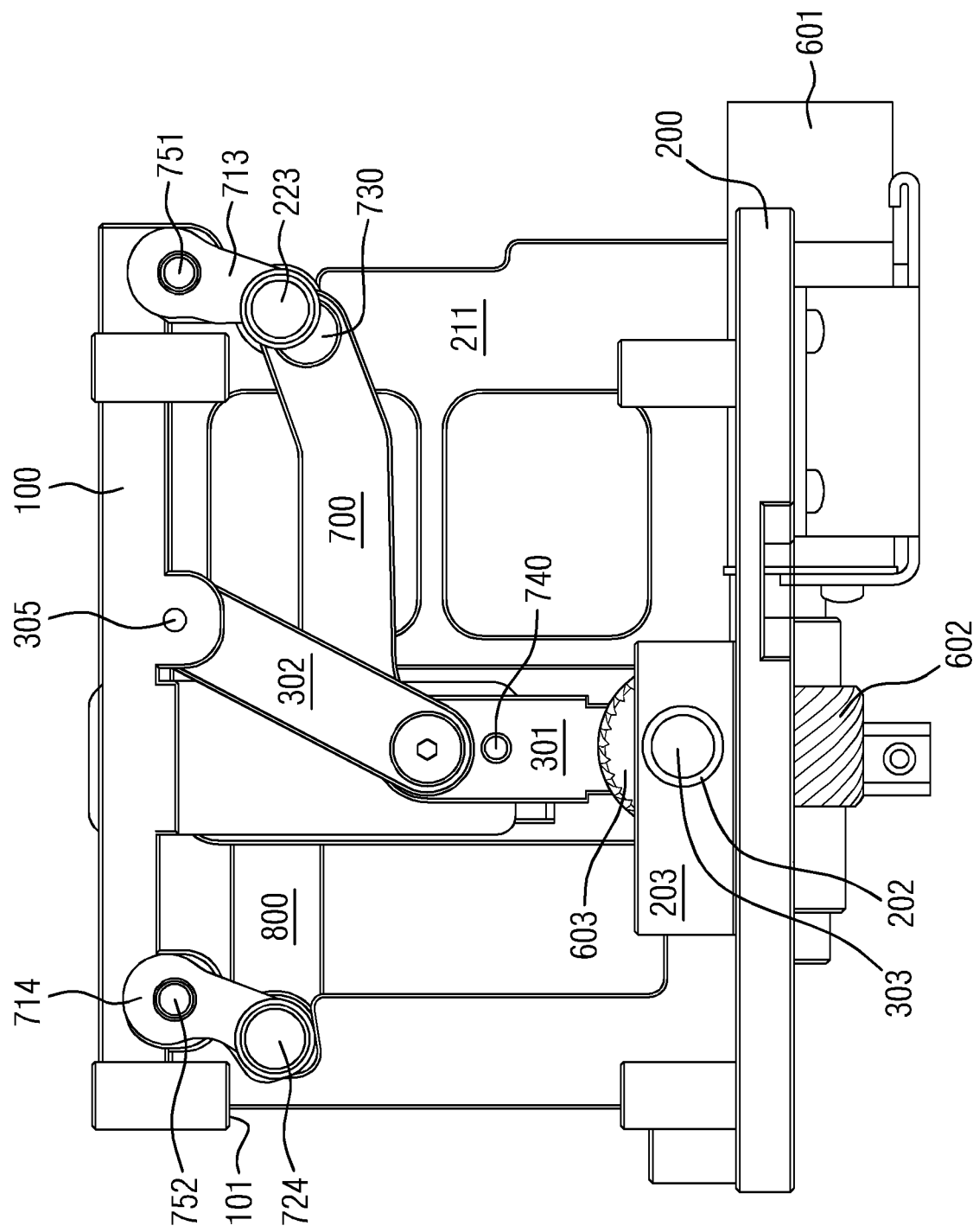
FIG. 5 a side view of the second exemplary embodiment in the second (upper) position.
Figure 6:
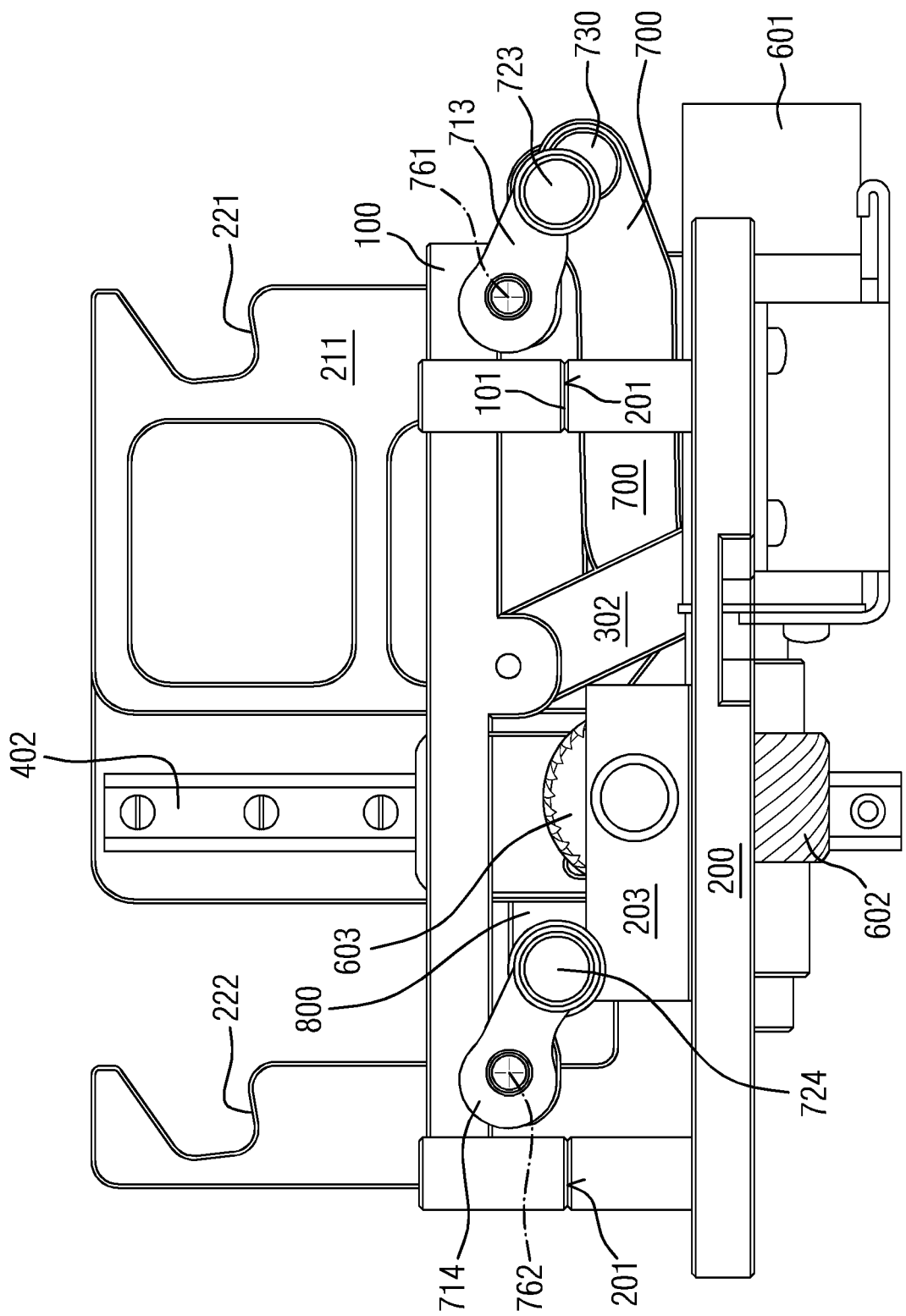
FIG. 6 a side view of the second exemplary embodiment in the first (lower) position.
Figure 7:
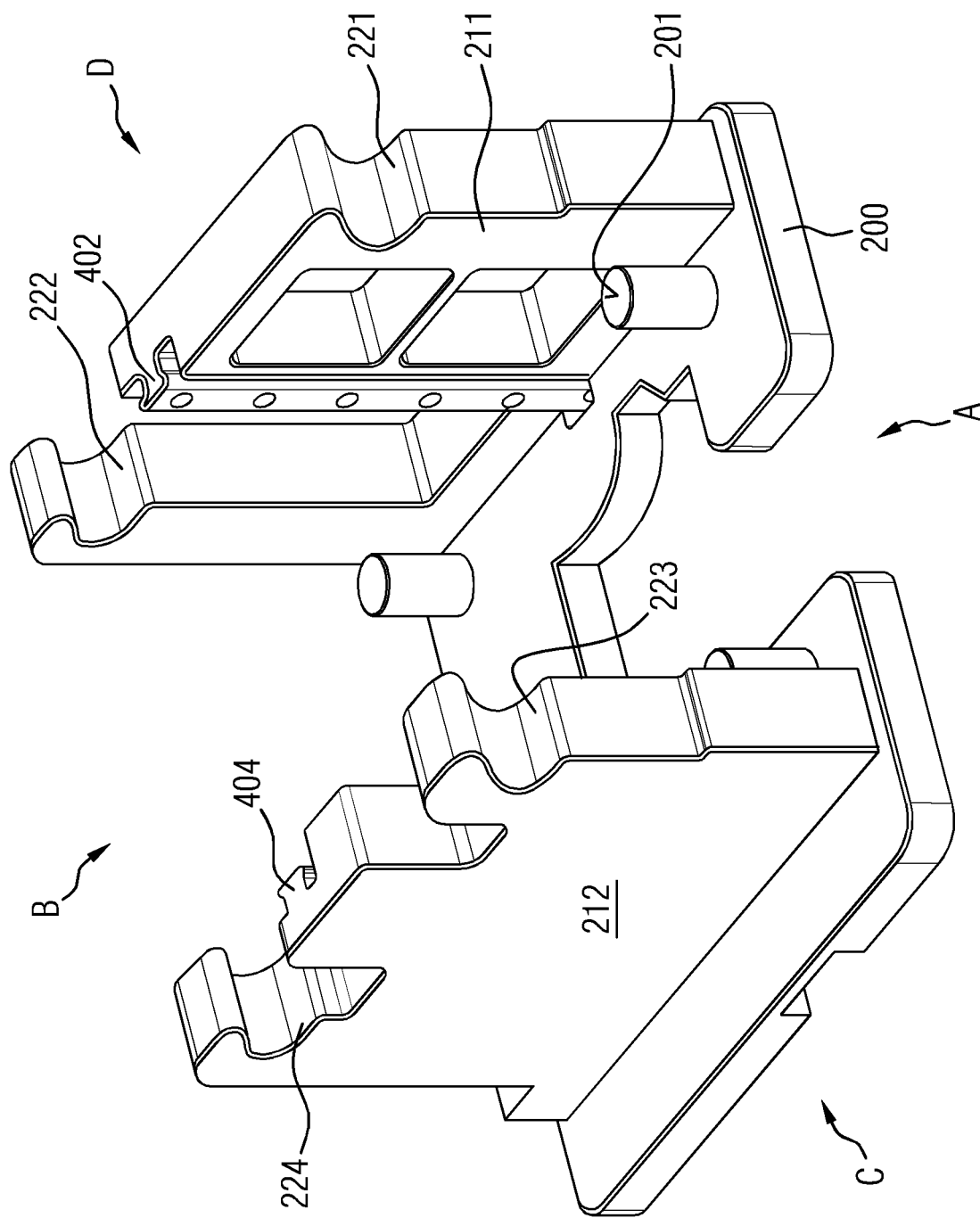
FIG. 7 a three-dimensional view of the main support of the second exemplary embodiment.

The second exemplary embodiment, shown in FIGS. 4-9, of a device has components and functions known from FIGS. 1-3, with the exception of the stop 500. In addition, there is a gear rod 700, second crank levers 711-714, a third joint 730, a fourth joint 740, second shafts 751, 752, a first side part 211 and a second side part 212 of the main support 200, a guide rail 404 (FIG. 7), a guide block 403 (FIG. 8), stops 221-224, stop elements 721-724, second shafts 751, 752, a coupling rod 800, and two connecting elements 901, 902. In FIGS. 4-6, furthermore, the second crank levers 711 and 712 are concealed by the second crank levers 713 and 714. The second side part 212 with the stops 223, 224, the guide rail 404 and the guide block 403 fixed to the equipment support, are not shown in FIGS. 4-6 so that the otherwise concealed components can be depicted and described.

The gear rod 700 is connected to the first crank lever 301 via the fourth joint 740 and to the second crank lever 711 via the third joint 730. The second crank levers 711-714 are in principle identical in structure and have the same function. The second crank lever 711 is additionally configured such that it is connected to the gear rod 700 via the third joint 730. The second crank levers 711 and 713 are attached to the second shaft 751, and the second crank levers 712 and 714 are attached to the second shaft 752, wherein the second crank levers 711, 713 and second shaft 751 are rotatable about the second rotational axis 761, and the second crank levers 712, 714 and second shaft 752 are rotatable about a third rotational axis 762, and the second rotational axis 761 and the third rotational axis 762 lie parallel to each other. The stop elements 721 and 723 are arranged on the second crank levers 711 and 713 at a distance from the rotational axis 761 of the second shaft 751, and the stop elements 722, 724 are arranged on the second crank levers 712 and 714 at a distance from third rotational axis 762 of the second shaft 752. A connecting element 901 connects the second crank levers 711, 713 together, and a connecting element 902 connects the second crank levers 712, 714 together. The connecting elements 901, 902 are configured such that, in the second position, the equipment support 100 rests thereon (FIG. 9 for connecting element 901), and hence the connecting elements 901, 902 serve as second support faces 903, 904.

The equipment support 100 is guided in the guide rails 402, 404 via the guide blocks 401, 403, wherein the guide block 401 is guided in the guide rail 402, and the guide block 403 is guided in the guide rail 404.

Figure 8:
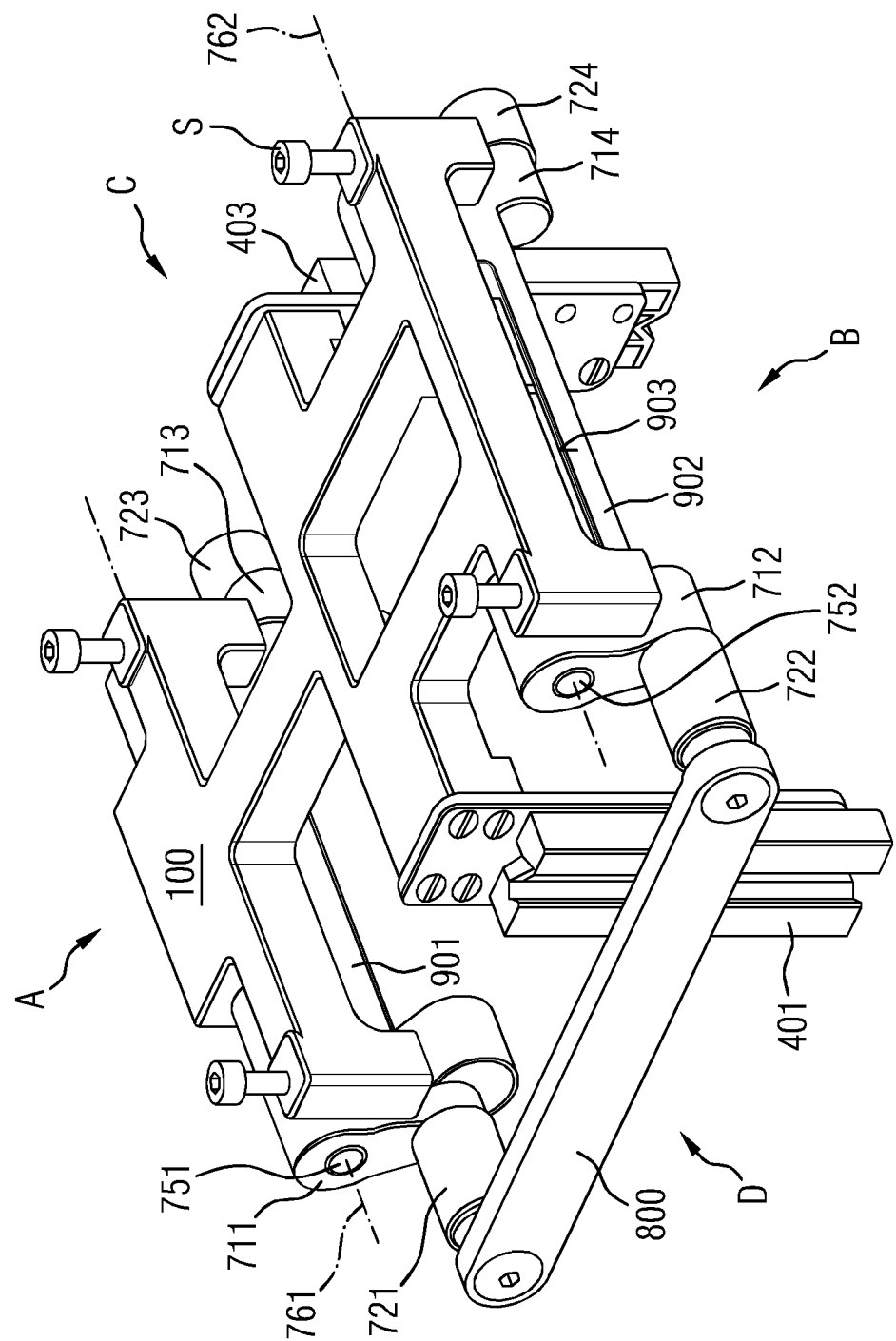
FIG. 8 a three-dimensional view of the equipment support with attachments of the second exemplary embodiment.
Figure 9:
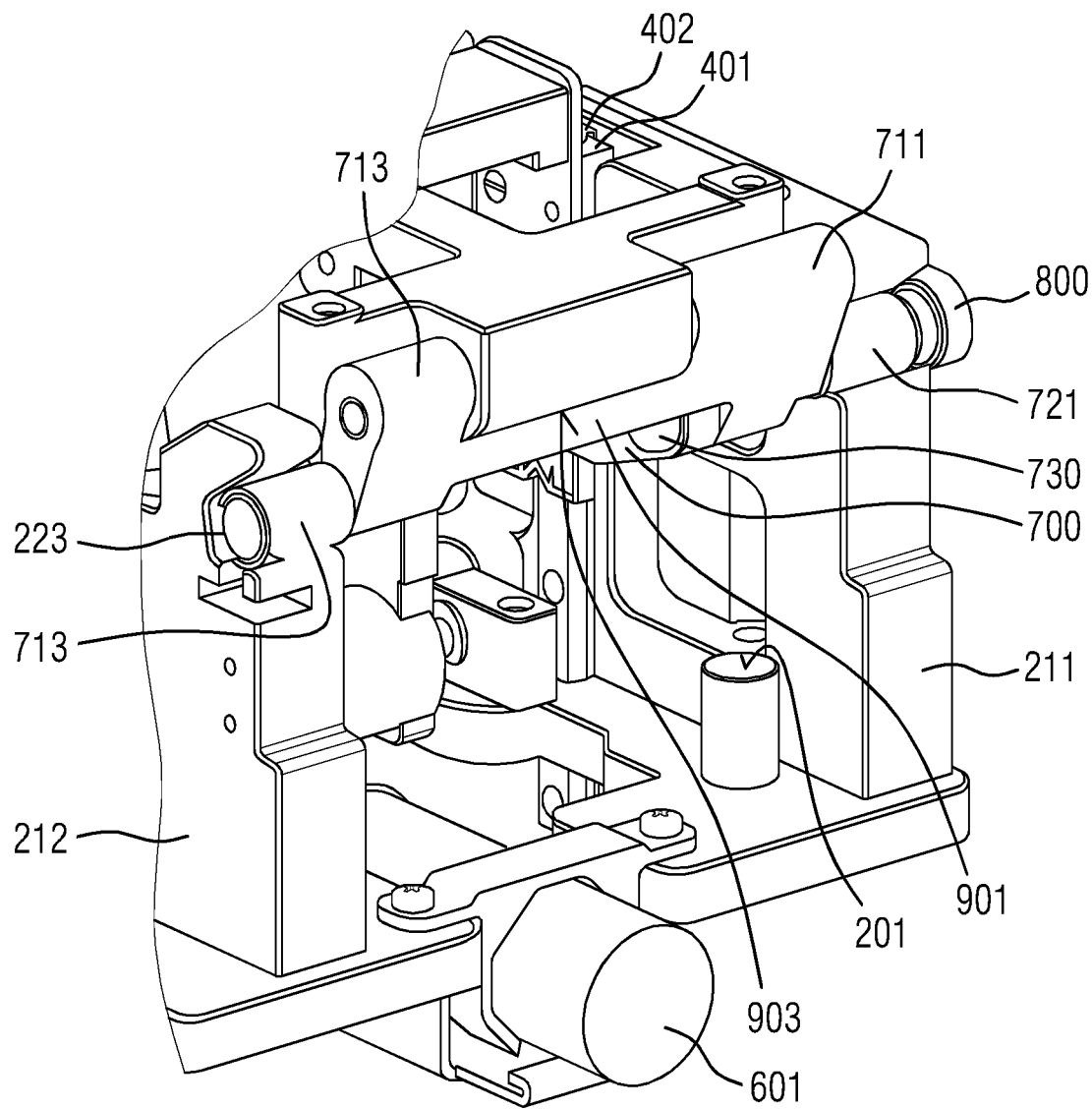
FIG. 9 a three-dimensional, partial view of the components depicted in FIGS. 7 and 8.

FIG. 8 also shows four Allen head screws S by means of which a device to be fixed to the equipment support 100 may be secured. The device may be secured by a different number of screws of a different type, or by other connections well known to the person skilled in the art, such as for example welding or by means of a clip connection.

If the spur gear 603 is turned counterclockwise starting from the position shown in FIG. 4, the equipment support 100 is moved upward until it reaches the upper dead center. At the same time, the stop elements 721-724 are moved to the right via the gear rod 700 and second crank levers 711-714, and largely retain this right-hand position. On further rotation counterclockwise, the second crank levers 711-714 are pivoted to the left, at the same time the equipment support 100 is lowered slightly and the stop elements 721-724 come into contact with the stops 221-224, wherein the stop element 721 rests on the stop 221, the stop element 722 rests on the stop 222, the stop element 723 rests on the stop 223, and the stop element 724 rests on the stop 224. At the same time, the equipment support 100 rests on the connecting elements 901, 902. The second crank lever 711 is driven directly by the gear rod 700 via the third joint 730, the second crank lever 713 is driven via the second crank lever 711 and the second shaft 751, the second crank lever 712 is driven by the second crank lever 711 via the coupling rod 800, and the second crank lever 714 is driven by the second crank lever 712 via the second shaft 752.

Instead of the second shafts 751, 752, mandrels may also be provided for mounting the second crank levers 711-714 by means of bearings such that the second crank levers 711, 713 are rotatable about the rotational axis 661, and the second crank levers 712, 714 are rotatable about the rotational axis 662. Then the second crank levers 711, 713 are only rigidly connected via the connecting element 901, while the second crank levers 712, 714 are only rigidly connected via the connecting element 902.

If the coupling rod 800 is to be omitted, the second crank levers 712, 714 may be driven via an additional gear rod which, in articulated fashion, connects the second crank lever 712 or 714 to the connecting rod 302 or the first crank lever 301.

Since, when the stop elements 721-724 rest on the stops 221-224, the stops 221-224 each surround the stop elements 721-724 by 50%, the contact of the stop elements 721-724 on the stops 221-224 causes a locking of the equipment support 100 to the main support 200.

Figure 10:
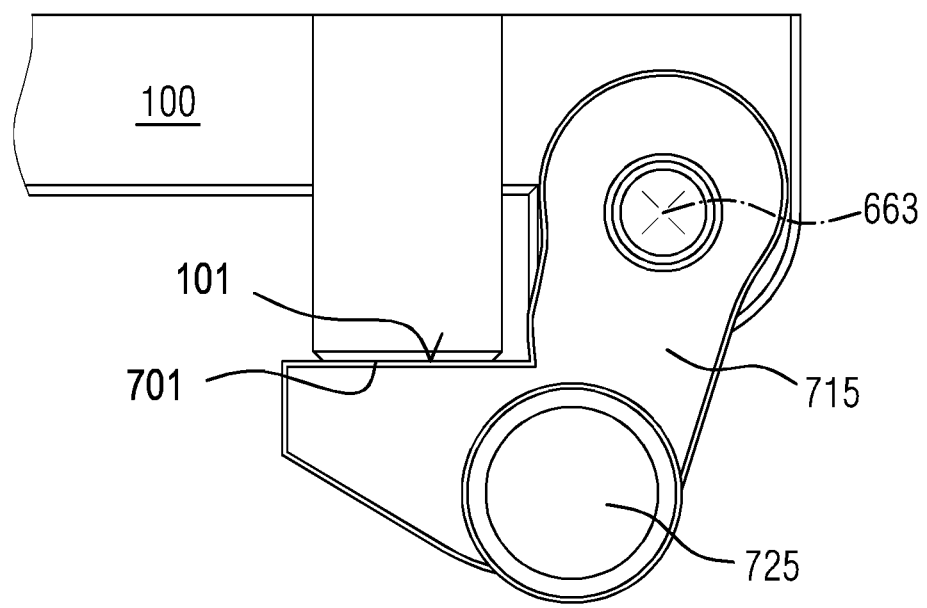
FIG. 10 a further possible embodiment of a second crank lever in cooperation with the equipment support in the second position.

FIG. 10 shows an equipment support 100 with support 101, a second crank lever 715 with a second support face 701, and also a stop element 725, shown in the second position. The second crank lever 715 can be pivoted about a second rotational axis 663. This pivotability may be achieved for example by a second shaft with the second rotational axis 663, or by a bearing arranged on a mandrel. In the depicted second position of the support 100, a force acting on the equipment support is transferred via the support 101 of the equipment support 100 into the second support face 701 of the second crank lever 715, and from there via the second crank lever 715 and stop element 725, into a stop (not shown), which may for example take the form of one of the stops 221-224. The equipment support 100 may have four of these second crank levers 715 which may differ from the second crank levers 711-714, described in connection with the second exemplary embodiment, solely by the design of the second support face 701. Then the connecting elements 901, 902 as the second support faces 903, 904 may be omitted.

In the above description, equivalent parts carry the same names even if in some cases they may differ in appearance. This is however regarded as suitable in view of the associated improved comprehensibility of the invention.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:
1. A device comprising:
a main support;
an equipment support having a first position and a second position adjustable relative to the height of the main support;
a first bearing rotatable about a first rotational axis;
a first crank lever mounted to the first bearing and rotatable about the first rotational axis, wherein the first crank lever is mounted to the first bearing one of directly and via a first shaft;
a connecting rod connected to the first crank lever via a first joint and to the equipment support via a second joint;
a guide arranged such that the equipment support is displaceable to remain parallel to the main support;
a stop, wherein the stop is one of arranged in and connected to the main support;
a stop element connected to one of the first crank lever and the connecting rod, wherein the connection is one of a rigid connection and via a second gear mechanism; and
wherein the equipment support passes an upper dead center position when moving from the first to the second position by rotation of the first crank lever and, upon further rotation of the first crank lever, the stop element comes into contact with the stop.
2. The device as claimed in claim 1, wherein the first crank lever is connected to a drive element one of directly and via a first gear mechanism.

3. The device as claimed in claim 2, wherein the drive element is configured as an electric motor.

4. The device as claimed in claim 1, wherein the stop element is connected via the second gear mechanism and wherein the second gear mechanism has a gear rod connected in articulated fashion to one of: the first crank lever and the connecting rod.

5. The device as claimed in claim 1, further comprising:
a second bearing rotatable about a second rotational axis;
a second crank lever mounted to the second bearing and rotatable about the second rotational axis;
wherein the stop element is arranged on the second crank lever at a distance from the second rotational axis; and
wherein the second crank lever is connected in articulated fashion to the gear rod at a distance from the second rotational axis.

6. The device as claimed in claim 5, wherein the second crank lever is mounted to the second bearing via a second shaft, and the second bearing is connected to the equipment support.

7. The device as claimed in claim 4, further comprising two second crank levers rotatable about the second rotational axis.

8. The device as claimed in claim 6, wherein the two second crank levers are arranged on the second shaft and are rigidly connected via the second shaft.

9. The device as claimed in claim 7, wherein the two second crank levers are rigidly connected via a connecting element.

10. The device as claimed in claim 9, wherein the connecting element is a support face for the equipment support.

11. The device as claimed in claim 1, wherein the stop element is formed as one of: a part circle and circle in face view.

12. The device as claimed in claim 1, wherein when the stop element rests on the stop, the stop at least partially surrounds the stop element by form fit.

13. The device as claimed in claim 12, wherein stop surrounds the stop element by up to 50%.

14. The device as claimed in claim 1, wherein in the first position the equipment support rests on one of:
the main support directly and via components connected to the main support.

* * * * *